(12) United States Patent
Hirai (10) Patent No.: US 8,300,112 B2
(45) Date of Patent: Oct. 30, 2012

(54) IMAGE PROCESSING APPARATUS AND CONTROL METHOD THEREFOR

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 11/772,551

(22) Filed: Jul. 2, 2007

(65) Prior Publication Data

US 2008/0122939 A1 May 29, 2008

(30) Foreign Application Priority Data

Jul. 3, 2006 (JP) ................................. 2006-183849

(51) Int. Cl.
*H04N 5/228* (2006.01)

(52) U.S. Cl. ..................................... 348/222.1; 348/239

(58) Field of Classification Search ............... 348/222.1, 348/239
See application file for complete search history.

(56) References Cited

U.S. PATENT DOCUMENTS

| 5,355,163 | A | 10/1994 | Tomitaka |
| 5,812,193 | A * | 9/1998 | Tomitaka et al. ............. 348/369 |
| 6,327,436 | B2 * | 12/2001 | Kawabe et al. ............... 396/121 |
| 7,248,294 | B2 * | 7/2007 | Slatter ...................... 348/240.99 |
| 7,298,412 | B2 * | 11/2007 | Sannoh et al. .................. 348/348 |
| 7,440,594 | B2 * | 10/2008 | Takenaka ....................... 382/118 |
| 7,558,408 | B1 * | 7/2009 | Steinberg et al. ............. 382/118 |
| 2003/0025812 | A1 * | 2/2003 | Slatter ........................ 348/240.2 |
| 2004/0207743 | A1 | 10/2004 | Nozaki et al. |
| 2005/0046730 | A1 | 3/2005 | Li |
| 2005/0088538 | A1 | 4/2005 | Nozaki et al. |
| 2005/0232502 | A1 | 10/2005 | Fukushima et al. |
| 2005/0264658 | A1 * | 12/2005 | Ray et al. ...................... 348/239 |
| 2006/0069999 | A1 * | 3/2006 | Mitsuhashi ................... 715/723 |
| 2006/0104523 | A1 * | 5/2006 | Suzuki .......................... 382/232 |
| 2009/0316016 | A1 * | 12/2009 | Iwamoto .................... 348/222.1 |

FOREIGN PATENT DOCUMENTS

| EP | 1 471 455 A2 | 10/2004 |
| JP | 06-153047 | 5/1994 |
| JP | 06-165016 | 6/1994 |
| JP | 2793817 | 6/1998 |
| JP | 10-232934 | 9/1998 |
| JP | 11-038313 | 2/1999 |

(Continued)

OTHER PUBLICATIONS

Satoh S et al: "Name-It: Naming and Detecting Faces in News Videos" IEEE Multimedia, IEEE Service Center, New York, NY, US, vol. 6, No. 1, (Jan. 1, 1999), pp. 22-35, XP000832068 ISSN: 1070-986X.

*Primary Examiner* — Usman Khan
(74) *Attorney, Agent, or Firm* — Cowan, Liebowitz & Latman, P.C.

(57) ABSTRACT

This invention improves the operability of an apparatus when the user focuses on the target object to obtain an image with an appropriate image quality. An image capturing apparatus includes an object detection unit, which detects an object from an image based on a signal output from an image sensor, a display unit which displays a marker corresponding to the position of the object detected by the object detection unit, and a change unit which changes the position of the marker displayed on the display unit. The change unit moves the marker to the position of an object detected by the object detection unit, that is different from the current position of the marker displayed on the display unit.

8 Claims, 6 Drawing Sheets

FOREIGN PATENT DOCUMENTS

| | | |
|---|---|---|
| JP | 2000-002833 | 1/2000 |
| JP | 2000-048184 | 2/2000 |
| JP | 2003-107335 A | 4/2003 |
| JP | 2004-317699 | 11/2004 |
| JP | 2005-102175 | 4/2005 |
| JP | 2005-117532 A | 4/2005 |
| JP | 2005-295379 | 10/2005 |
| JP | 2005-318515 | 11/2005 |
| KR | 2002-21731 A | 3/2002 |
| KR | 2006-39893 A | 5/2006 |

* cited by examiner

IMAGE PROCESSING APPARATUS AND CONTROL METHOD THEREFOR

BACKGROUND OF THE INVENTION

1. Field of the Invention

The present invention relates to an image capturing apparatus having a function of causing a display unit to display the position of an object, and a control method therefor.

2. Description of the Related Art

There has conventionally been known a method of allowing the user to selectively or freely set a focus detection frame at an arbitrary position on the window to execute auto-focusing in a focus detection area corresponding to the position of this frame. In this method, for example, the initial position of a focus detection frame is set at the center of the window to move the frame left, right, up, and down by operating, for instance, a cross-shaped button. This allows auto-focusing at a position intended by the user to result in an increase in the degree of freedom of framing in image capture.

There has also been known a method of detecting a face from the window and automatically setting a focus detection frame at the face position to detect the focus. This allows focus detection by face position. However, when a plurality of objects exist, focus detection may not always succeed in detecting the person intended by the camera user, and the user not be able to obtain an intended result.

There has also been known a method of increasing the number of object areas selected by external button manipulation in order to execute image capture with a deep depth of focus (see Japanese Patent Laid-Open No. 11-038313).

There is available another technique of detecting an object from an image and processing the object (see Japanese Patent No. 2793817). This technique automatically detects an object from an image using a neural network, and controls exposure using the luminance value only within the area of the detected object.

Unfortunately, Japanese Patent Laid-Open No. 11-038313 described above is not always effective when the user wishes to focus on a specific object.

Japanese Patent No. 2793817 described above cannot always obtain an image desired by the user even by detecting an object and controlling exposure using only the luminance value of the object. For example, when a plurality of persons exist within the window and exhibit different light amounts, controlling exposure by focusing on an object other than the object targeted by the user may cause overexposure or the like in the given user's target object area.

SUMMARY OF THE INVENTION

The present invention has been made in consideration of the above problems, and has as its object to improve effectiveness when the user focuses on their intended object.

In order to solve the above problems, and achieve the above object, according to a first aspect of the present invention, there is provided an image capturing apparatus comprising an object detection unit which detects an object from an image based on a signal output from an image sensor, a change unit which changes the position of the marker displayed on a display unit which displays a marker corresponding to a position of the object detected by the object detection unit, wherein the change unit moves the marker to a position of an object detected by the object detection unit, that is different from a current position of the marker displayed on the display unit, and a setting unit which executes an image capturing setting so that an object area corresponding to the position of the object displayed on the display unit exhibits an appropriate imaging state.

According to a second aspect of the present invention, there is provided a method of controlling an image capturing apparatus, comprising an object detection step of detecting an object from an image based on a signal output from an image sensor, a change step of causing a change unit which changes a position of a marker that corresponds to a position of the object detected in the object detection step and is displayed on a display unit to move the marker to a position of an object detected in the object detection step, that is different from a current position of the marker displayed on the display unit, and a setting step which executes an image capturing setting so that an object area corresponding to the position of the object displayed on the display unit exhibits an appropriate imaging state.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings.

First Embodiment

Figure 1:
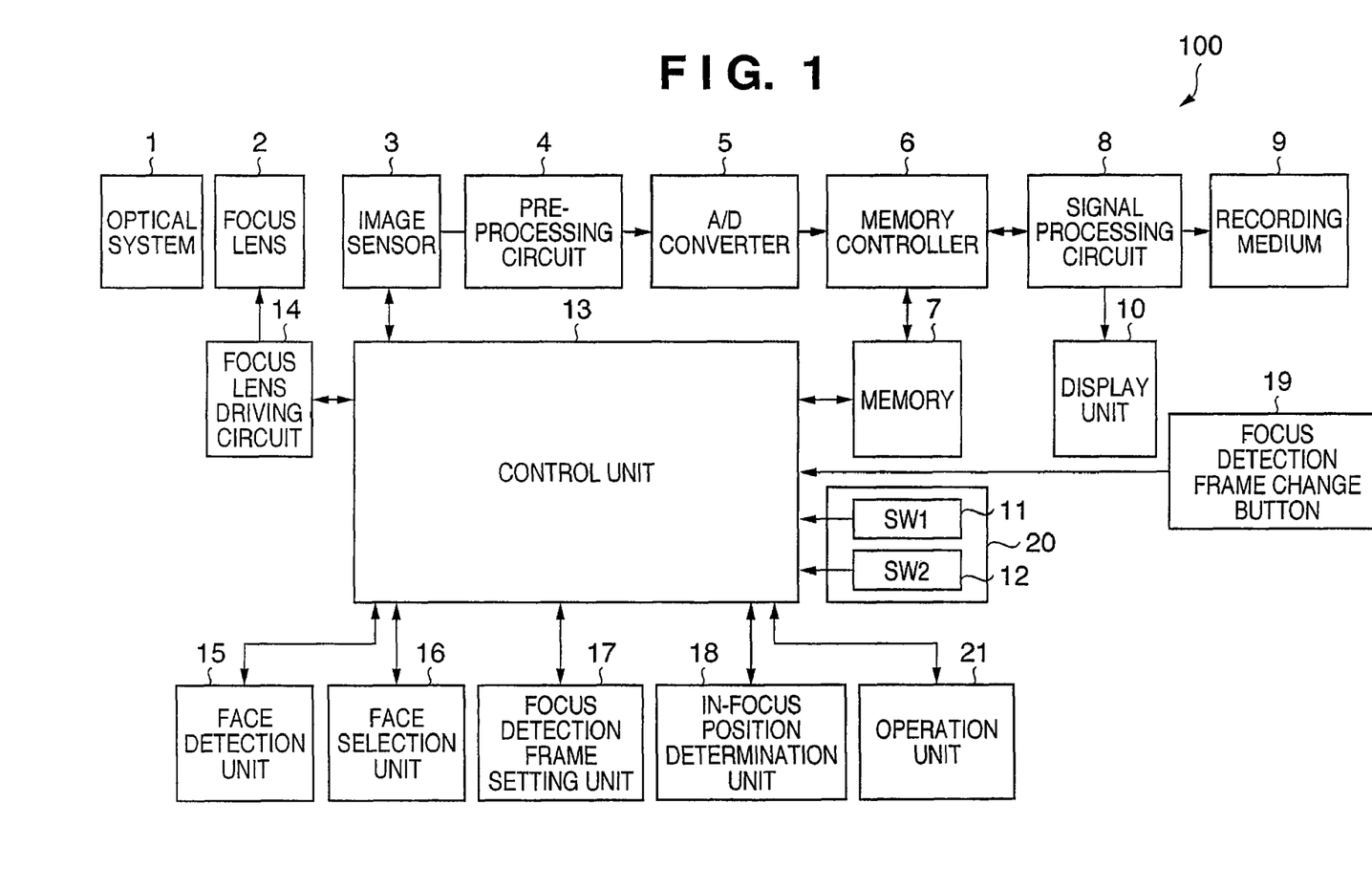
FIG. 1 is a block diagram showing the arrangement of a digital camera according to the first embodiment of the present invention.

FIG. 1 is a block diagram showing the schematic arrangement of a digital camera 100 which sets a focus detection frame and focus detection area using a face detection function to execute auto-focusing in the first embodiment.

The digital camera 100 according to the first embodiment comprises an optical system 1 and focus lens 2, and causes an image sensor 3 to photo-electrically convert the light imaged by them. The output signal from the image sensor 3 is digitized via a preprocessing circuit 4 and A/D converter 5. The preprocessing circuit 4 comprises a CDS circuit and nonlinear amplification circuit for removing output noise. The digital signal is stored in a memory 7 via a memory controller 6, converted into an image (image information) by a signal processing circuit 8, and recorded on a recording medium 9. A display unit 10 displays the image converted by the signal processing circuit 8. A control unit 13 controls the display of the image on the display unit 10.

A face detection unit 15 (object detection unit) detects a face from the captured image signal (image). The face detection unit 15 detects and stores face position information using an image generated for display on the display unit 10 (an electronic viewfinder [EVF] in the first embodiment). The face detection unit 15 repeats this operation to always store the latest face detection result while the display unit performs through display (while the display unit sequentially displays the captured images). That is, the face detection unit 15 executes face detection asynchronously with the operation timing of a focus detection frame change button 19 (to be described later) (a frame displayed on the display unit moves in accordance with a frame change instruction by the operation of the focus detection frame change button).

The face detection unit 15 may use a known face detection method. Various kinds of face detection techniques are known. For example, a technique using learning represented by a neural network is available. There is also available a technique of identifying a portion having a characteristic physical shape, such as an eye, nose, mouth, and the profile of a face from image information using template matching. There is also available a technique using statistical analysis by detecting features of image information, such as the color of skin and the shape of an eye (for example, see Japanese Patent Laid-Open Nos. 10-232934 and 2000-48184). There is also available a technique of determining whether the face position in question is near the position at which a face area has been detected immediately before, determining the color near the face area to consider the color of clothes, or setting lower threshold values for face detection at positions nearer to the center of the window. This embodiment adopts a face identification process using a technique of detecting a pair of eyes (both eyes), nose, mouth, and the profile of a face, and determining the face in accordance with their relative positions.

In this case, the face detection unit 15 always executes face detection. However, the face detection unit 15 may execute face detection when the user turns on a switch SW1 11 by pressing a release button 20 halfway.

As the user presses the focus detection frame change button 19, he/she changes a focus detection frame (a frame indicating a position within the window displayed on the display unit) using the face detection unit 15, a face selection unit 16, and a focus detection frame setting unit 17. That is, the focus detection frame change button 19 instructs a change of the focus detection frame displayed within the window. At the same time, a focus adjustment area (focus detection area) in the image sensor is changed. Details of this operation will be described later. Before pressing the focus detection frame change button 19, the frame may be set at the center position of the window to set a focus detection area corresponding to this frame as a focus adjustment area.

The control unit 13 controls the focus operation. The focus lens 2 moves via a focus lens driving circuit 14. In accordance with the captured image signal, an in-focus position determination unit 18 detects a focus lens position that exhibits a peak sharpness, i.e., contrast (in-focus state) of the image in the focus detection area. The focus lens 2 moves to this focus lens position. In auto-focusing of a contrast detection scheme, the in-focus position determination unit 18 may extract an image signal of an area with an arbitrary size at an arbitrary position within the window and detect a position that exhibits a maximum contrast of this signal. It is therefore possible to set the focus detection frame at an arbitrary position within the window.

The focus operation is done when the user turns on the switch SW1 11 by pressing the release button 20 halfway. Image capture and recording are done when a switch SW2 12 is turned on by pressing the release button 20 fully.

An operation unit 21 comprises an operation member for inputting various kinds of settings of the digital camera 100. This operation member includes a focus mode setting button for setting the auto-focusing mode of the digital camera 100.

An operation when the user has pressed the focus detection frame change button 19 will be explained in more detail with reference to the flowchart shown in FIG. 2. A case will be exemplified in which a focus detection frame and focus detection area move to a face position on the right side of the window every time the user presses the focus detection frame change button 19.

Figure 2:
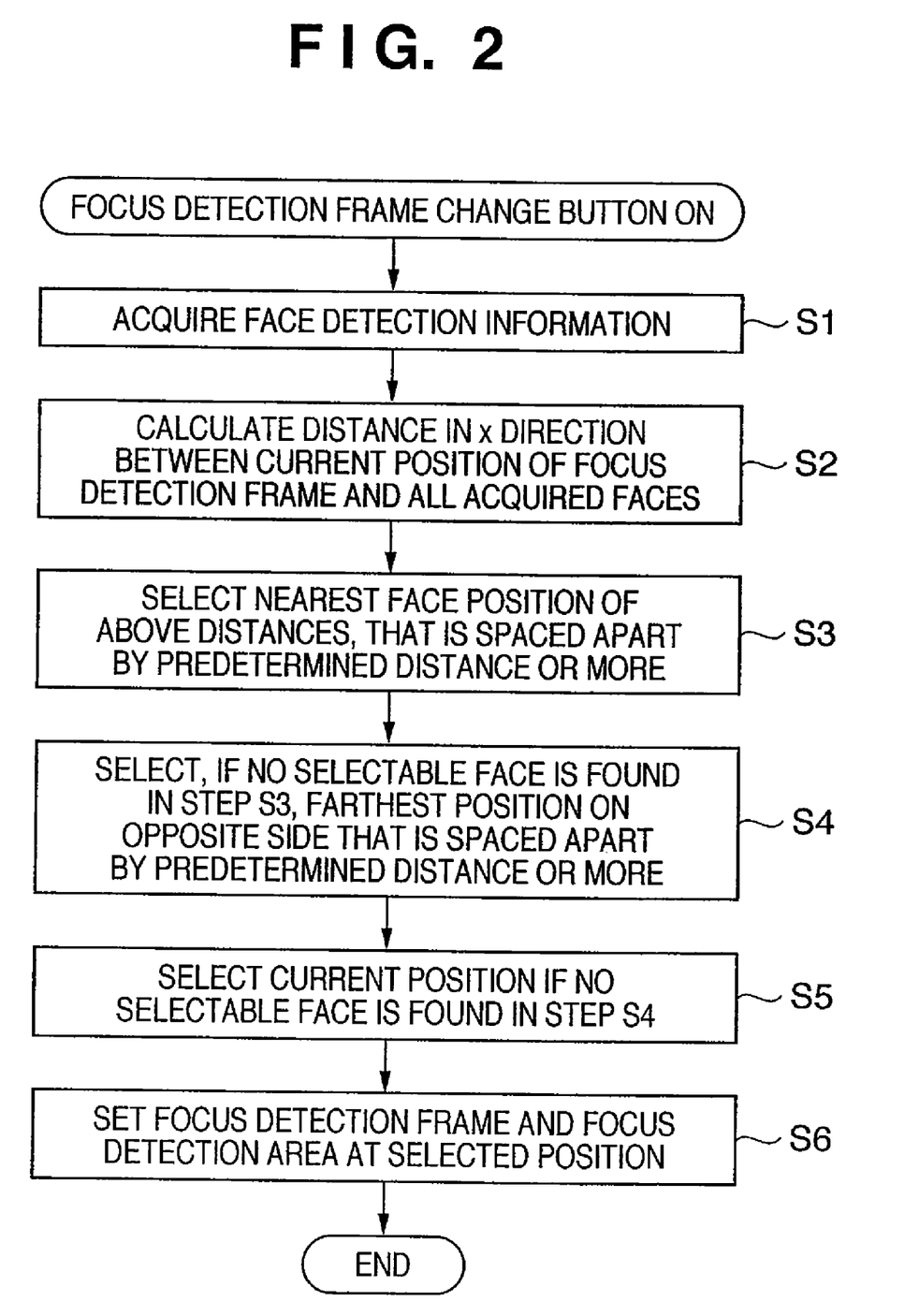
FIG. 2 is a flowchart illustrating a focus detection frame setting operation when a focus detection frame change button is pressed in the first embodiment.

When the focus mode setting button included in the operation unit 21 of the digital camera 100 is set to a person priority mode, the operation of the flowchart shown in FIG. 2 starts.

Figure 3A:
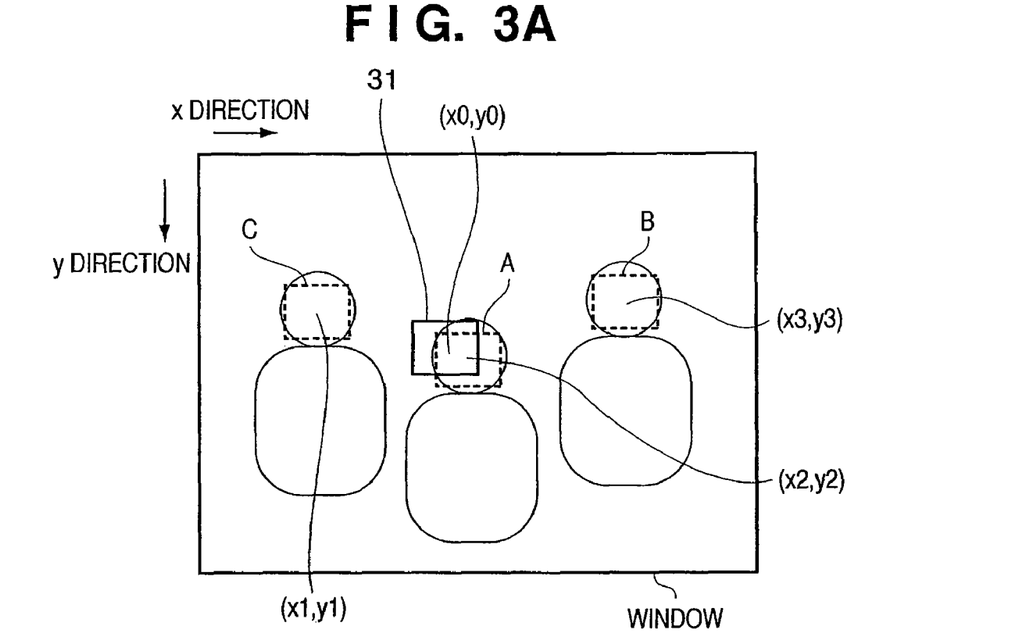
FIG. 3A is a view representing a framing example and face detection result.

At the start of the flowchart shown in FIG. 2, a focus detection frame 31 (see FIG. 3A) is set and displayed at the center position of the window in the viewfinder, as shown in FIG. 3A.

In step S1, the face detection unit 15 acquires face position information from the image signal obtained from the image sensor 3. Since the face detection unit 15 always detects and stores the latest face position, it is possible to acquire the latest face position information when the user has pressed the focus detection frame change button 19. Assume here that the face detection unit 15 acquires and uses all the detected face position information. However, the user may selectively avoid the use of information with a small face or low reliability.

In step S2, the distance and direction between the positions of all the acquired faces within the window and the current position of the focus detection frame displayed within the window are checked. In the example of FIG. 3A, a distance di is calculated by:

$$di = xi - x0$$

where $(x0, y0)$ is the current position of the focus detection frame 31, and $(xi, yi)$ is the acquired face position ($i=1, 2, \ldots, N$).

In step S3, a face position that exhibits a minimum distance di which satisfies:

$$di > TH$$

is selected. In the example of FIG. 3A, assume that:

$$d2 = x2 - x0 < TH$$

Since only person B has a face whose position satisfies the above inequality, the face position of person B is selected. The persons and camera always move and so the framing always changes as well. Hence, the threshold value TH is set here to prevent the same person from being selected twice. Setting a predetermined distance as the threshold value TH makes it easy to select different persons.

In FIG. 3A, the face of person A at the center overlaps a focus detection area corresponding to the focus detection frame 31 at the initial position. For this reason, the focus detection area corresponding to the focus detection frame 31 at the initial position is thought to be capable of focusing on the face of person A at the center. That is, when the user wants to focus on person A at the center of the window, the focus detection area corresponding to the focus detection frame 31 at the initial position allows focusing. Even when the focus detection area moves from the initial position to the position of person B upon pressing the focus detection frame change button 19, it is possible to focus on person A at the center as long as the user does not press the focus detection frame change button 19. This makes it possible to avoid the problem of not being able to focus on person A at the center. In other words, if the focus detection frame change button 19 is pressed, the focus detection area moves from the initial position to the position of person B, and if the focus detection frame change button 19 is not pressed, it is possible to focus on person A.

Figure 3B:
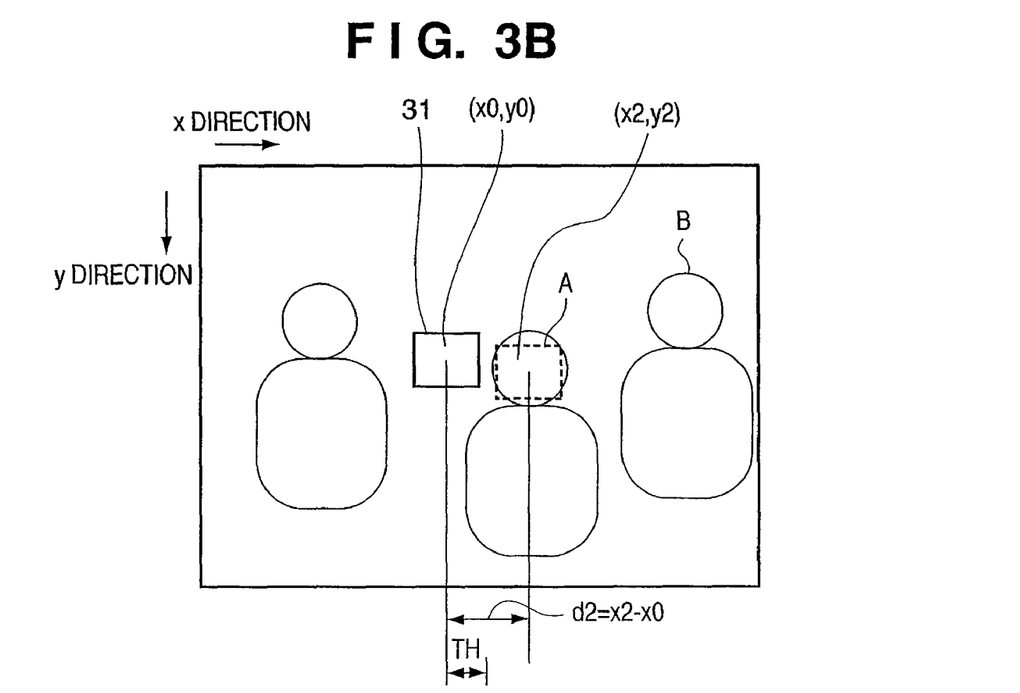
FIG. 3B is a view representing another framing example and face detection result.

As shown in FIG. 3B, person A near the center of the window may fall outside the focus detection area corresponding to the focus detection frame 31 at the initial position. When the focus detection area moves from the initial position to the position of person B, it becomes impossible to focus on person A near the center of the window. This is inconvenient for the user who wants to focus on a person near the center of the window. To prevent such inconveniences, when person A near the center falls outside the focus detection area corresponding to the focus detection frame 31 at the initial position as shown in FIG. 3B, the threshold value TH is set to be about half the width of the focus detection frame 31 so that the distance d2 from the position x0 of the face of person A satisfies d2=x2−x0>TH. With this operation, the focus detection frame and the focus detection area corresponding to it move from the initial position to the position of the face of person A upon pressing the focus detection frame change button 19. This makes it possible to prevent the focus detection frame and the focus detection area corresponding to it from skipping the position of person A and moving to the position of the face of person B.

If person B does not exist in step S3, a face position (a far face position in a direction different from a specific direction within the window) that exhibits a maximum absolute value of a distance di which satisfies:

$$di<-TH$$

is selected in step S4.

Since the distance di has a negative sign, the face on the left side of the window is selected. In the example of FIG. 3A, the face position of person C is selected.

If person C shown in FIG. 3A does not exist either, the current focus detection frame 31 is selected in step S5. When a face such as the face of person A whose position satisfies −TH<di<TH, this face position may be selected.

In step S6, the focus detection frame and focus detection area are set at the selected face position.

According to the above-described embodiment, it is possible to easily set the focus detection frame and focus detection area to a face intended by the user. It is also possible to always set the focus detection frame and focus detection area in the latest object and framing. This makes it possible to improve the operability when the user focuses on the target object.

Although the focus detection frame 31 at the initial position is set at the center of the window in the first embodiment, it may be set at the face position of a person (person A in FIG. 3A) that is nearest to the center of the window.

The above description is concerned with the apparatus in which the focus detection frame and focus detection area move to a face position on the right side of the window every time the user presses the focus detection frame change button 19. However, the focus detection frame may move in an arbitrary direction other than to the right side of the window.

In the first embodiment, as the user presses the focus detection frame change button 19, the focus detection frame and focus detection area are changed. However, as the user presses the focus detection frame change button 19, the focus detection area may be changed after changing the focus detection frame indicating a face position within the window, and vice versa. Focus detection may be done in a focus detection area corresponding to the focus detection frame finally selected by the user, without changing the focus detection area during movement of the focus detection frame.

In the first embodiment, the user operates the focus detection frame change button 19 to move the frame and change the focus detection area. However, the present invention is not limited to this. The user may change the settings of the apparatus in image capture. For example, control may be done in accordance with the object position changed by the user, so that exposure of an image area corresponding to the object position becomes appropriate.

Second Embodiment

The second embodiment will be described. In the first embodiment, the selected face moves to the right in the window. In the second embodiment, the selected face moves from the center or its vicinity to the periphery.

The second embodiment is different from the first embodiment in the determination methods in steps S2, S3, and S4. This difference will be explained with reference to the flowchart shown in FIG. 4.

Figure 4:
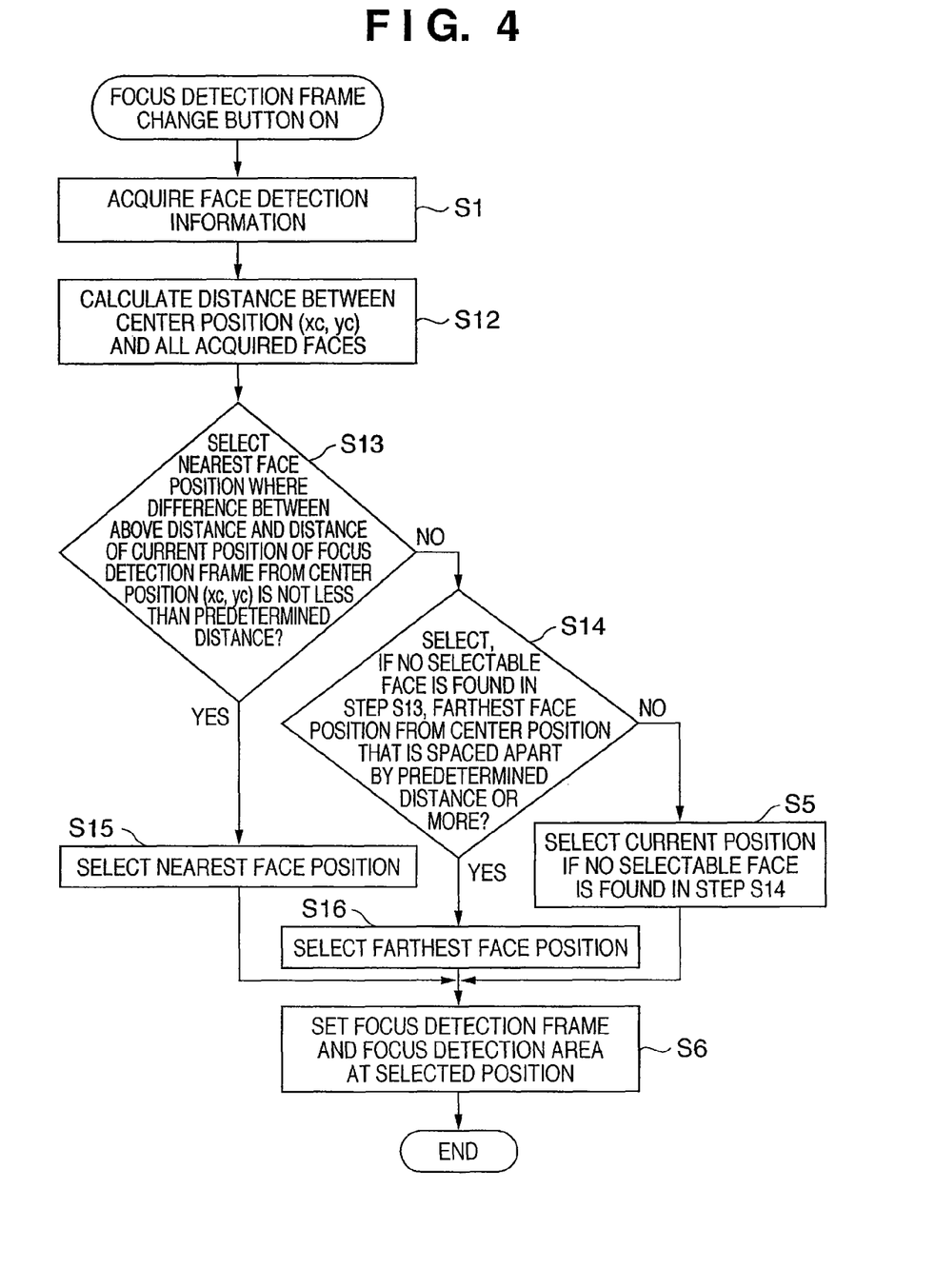
FIG. 4 is a flowchart illustrating a focus detection frame setting operation when a focus detection frame change button is pressed in the second embodiment.

In step S12, a distance di from the center position is calculated by:

$$di=\sqrt{\{(xi-xc)^2+(yi-yc)^2\}}-\sqrt{\{(x0-xc)^2+(y0-yc)^2\}}$$

where (xc, yc) is the position of the center or its vicinity of the window.

In steps S13 and S15, a face position that exhibits a minimum distance di which satisfies:

$$di>TH$$

is selected.

If no face is selectable in step S13, a face position that exhibits a maximum absolute value of a distance di which satisfies:

$$di<-TH$$

is selected in steps S14 and S16.

As described above, according to the second embodiment, it is possible to sequentially select faces from a face near the center to the periphery unlike the first embodiment. This makes it possible to improve the operability when the user focuses on the target object.

In the second embodiment, the user operates the focus detection frame change button 19 to move the frame and change the focus detection area. However, the present invention is not limited to this. The user may change the settings of the apparatus in image capture. For example, control may be done in accordance with the object position changed by the user, so that exposure of an image area corresponding to the object position becomes appropriate.

Third Embodiment

The third embodiment will be described. In the third embodiment, a method of setting the priority order of the detected faces and determining their selection order using the resultant priority order will be explained. The basic arrangement of a digital camera is the same as that in the first embodiment.

The priority order setting of the detected faces is as follows.

Figure 5A:
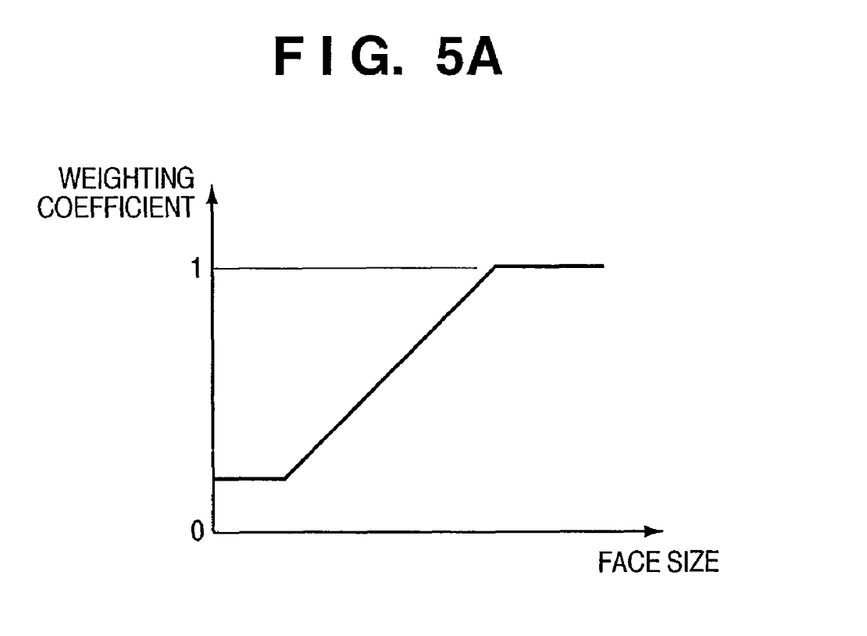
FIG. 5A is a graph showing a change in a weighting coefficient for determining priority.
Figure 5B:
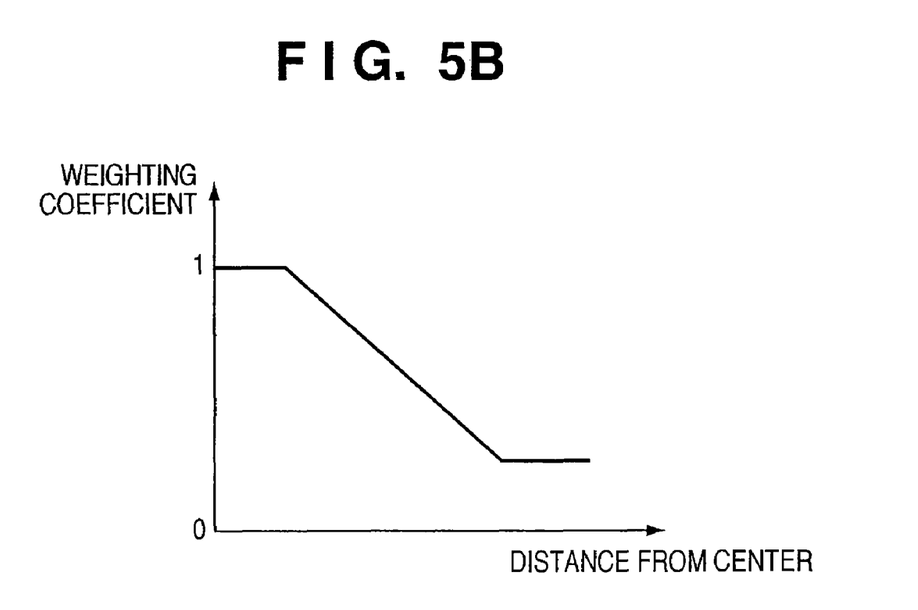
FIG. 5B is a graph showing a change in a weighting coefficient for determining priority.

For example, priority order setting is done using the face size and position in the following way. First, a weighting coefficient corresponding to the size of the detected face is calculated in accordance with the graph shown in FIG. 5A. A weighting coefficient corresponding to the distance from the center to the face is also calculated in accordance with the graph shown in FIG. 5B. As the size of the face increases and the face position becomes nearer to the center, the weighting coefficient is set at a larger value. The product of the two weighting coefficients is calculated to give a higher priority level to a face that exhibits a larger product.

Figure 6:
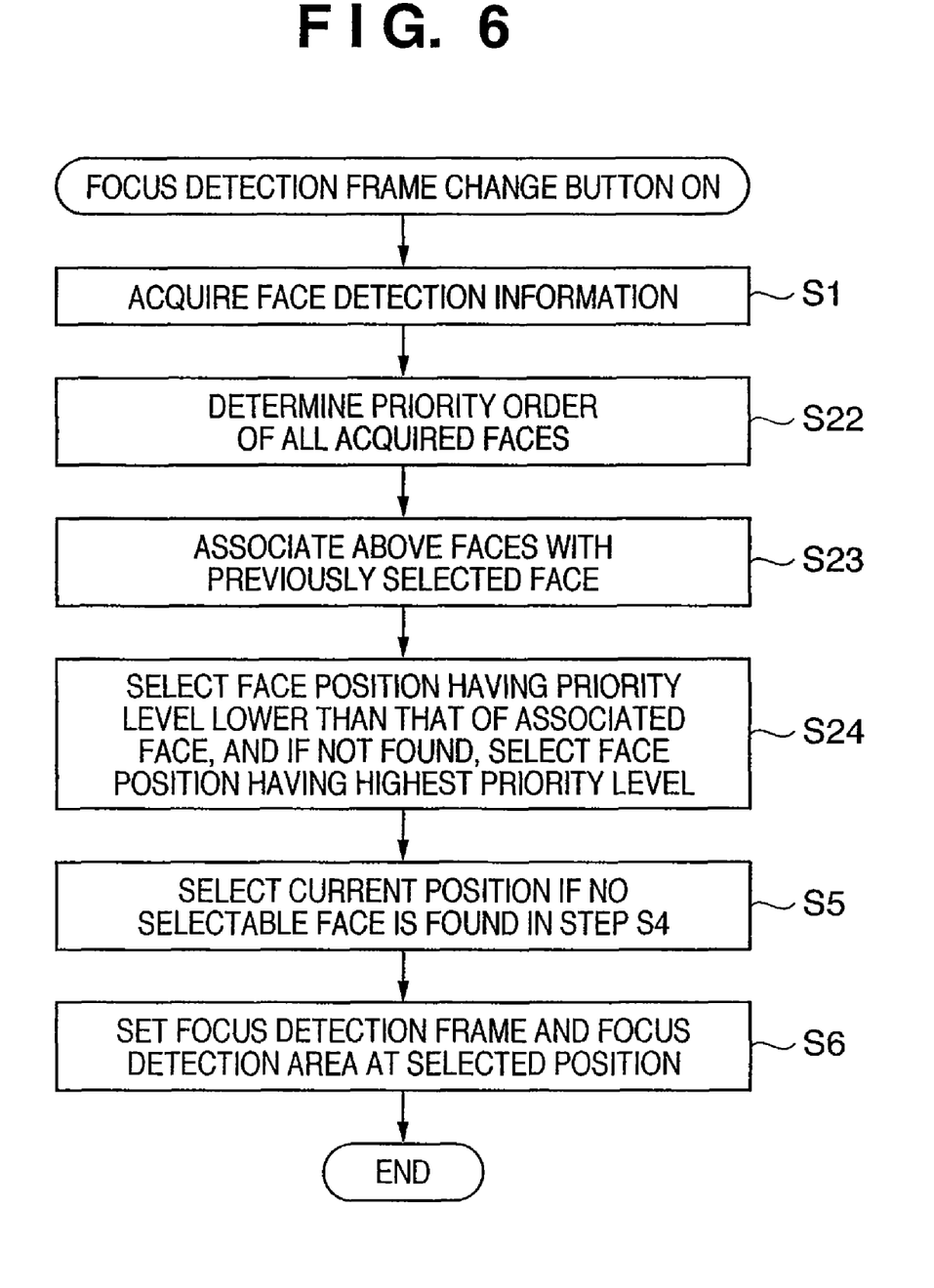
FIG. 6 is a flowchart illustrating a focus detection frame setting operation when a focus detection frame change button is pressed in the third embodiment.

How to select a face using this priority order will be explained with reference to the flowchart shown in FIG. 6. The third embodiment is different from the first embodiment in steps S2, S3, and S4.

In step S22, the priority order of all the acquired faces is determined using the above-described method.

In step S23, a face which can be said to be identical with the previously selected face is selected from the faces acquired at this time.

For example, let (xp, yp) be the previously selected face position, Sp be the length of the face, (xi, yi) (i=1, 2, ..., N) be the face position acquired at the current time, and Si be the length of the face. In this case, a face whose position is nearest to the previous face position and which satisfies:

$$\sqrt{\{(xi-xp)^2+(yi-yp)^2\}} < TH1, \text{ and}$$

$$|Si-Sp| < TH2$$

is selected. This makes it possible to associate the previously selected face with a face having a similar size and position and which has shifted from the previous face position by the shortest distance.

In step S24, a face having a priority level one level lower than that of the associated face is selected. If the associated face has the lowest priority level, a face having the highest priority level is selected.

The above-described arrangement can set the focus detection frame in accordance with the face priority even when the object or framing has changed.

In the third embodiment, the user operates the focus detection frame change button 19 to move the frame and change the focus detection area. However, the present invention is not limited to this. The user may change the settings of the apparatus in image capture. For example, control may be done in accordance with the object position changed by the user, so that exposure of an image area corresponding to the object position becomes appropriate.

The first to third embodiments have exemplified the arrangement and operation of a digital camera having a face detection function. However, there is also available a digital camera which detects an object other than a face to move the position of the object in accordance with the user instruction. An example is a digital camera which sequentially moves the frame to correspond to a plurality of objects extracted from the background.

In the first to third embodiments, the image capturing apparatus has an arrangement in which a focus detection frame displayed on the display unit moves to other objects on the basis of a user instruction. The image capturing apparatus executes focus detection in a focus detection area corresponding to the moved focus detection frame to be able to focus on a place that is more suited to the intention of the user. However, the present invention is not limited to this. An example is an image capturing apparatus which moves the position of the object displayed on the display unit to other object positions on the basis of a user instruction. The image capturing apparatus then optimally maintains the balance between the exposure state of an area corresponding to the object designated by the user and the exposure state of its peripheral area. This makes it possible to optimally correct the exposure state of the object targeted by the user to obtain an optimal video image depending on the type of object and the image capturing condition. To set a white balance process parameter, the image capturing apparatus may attain an optimal white balance of the object by referring to the object position on the display unit on the basis of the user instruction.

Assume that the display unit 10 enlarges an image recorded on a recording medium 9 upon conversion by a signal processing circuit 8 or an image displayed on a display unit 10 upon conversion by the signal processing circuit 8. In this case, the above-described object selection method may be adopted when the user is provided with a selection switch to select an object to be enlarged.

More specifically, on the basis of the image recorded on the recording medium 9 or the image displayed on the display unit 10, a face detection unit 15 detects a face position and displays the marker of the object position in a corresponding area within the display window. When the user issues a frame position change instruction, a face position that falls outside a predetermined distance of a threshold value TH is selected. The frame may move in an arbitrary direction or from the center to the periphery. To change the frame position in accordance with the user instruction, a determination means for determining the current object position may be prepared to select an object other than the currently selected object, i.e., not to select the same face twice.

Other Embodiment

The object of each embodiment is achieved even by the following method. That is, a storage medium (or recording medium) which records software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments, and the storage medium which stores the program codes constitutes the present invention. In addition to the case in which the functions of the above-described embodiments are implemented when the readout program codes are executed by the computer, the present invention incorporates the following case. That is, the functions of the above-described embodiments are implemented when the operating system (OS) running on the computer performs part or all of the actual processing on the basis of the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of the actual processing on the basis of the instructions of the program codes.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-183849, filed Jul. 3, 2006, which is hereby incorporated by reference herein in its entirety.

What is claimed is:

1. An image capturing apparatus comprising:
   an object detection unit which detects an object from image signals generated based on output signals from an image sensor;
   a selection unit which selects one object position as an object position to be focused from plurality of object positions detected in one image signal by said object detection unit, said selection unit making a display unit, which displays images using the image signals, display a marker based on the selected object position; and
   a change member which makes said selection unit select an object position which is different from the object position selected by said selection unit,
   wherein in a case that a plurality of object positions are detected by said object detection unit when an instruction to move a position of the marker is issued by said change member, said selection unit newly selects an object position, which is nearest to a previous position of the object previously detected from a previous image and corresponding to the marker currently displayed on the display unit, from the plurality of object positions which are detected by said object detection unit and satisfy a predetermined condition, wherein the predetermined condition includes a status that the plurality of object positions are away from the previous position of the object by a predetermined distance, and said selection unit makes said display unit display the marker based on the newly selected object position.

2. An apparatus according to claim 1, wherein said object detection unit detects a face from the image signal, and said display unit displays a marker corresponding to a position of the face detected by said object detection unit.

3. An apparatus according to claim 1, wherein said object detection unit detects the object from the image asynchronously with an operation timing of said change member.

4. An apparatus according to claim 1, wherein the predetermined condition includes a status that the plurality of object positions exist a predetermined side of the previous position of the object.

5. An apparatus according to claim 1, wherein the predetermined condition includes a status that the plurality of object positions correspond to objects whose reliability is not less than a predetermined value.

6. An apparatus according to claim 1, wherein the predetermined condition includes a status that the plurality of object positions correspond to objects whose size is not less than a predetermined size.

7. An apparatus according to claim 1, wherein the predetermined condition includes a status that the plurality of object positions correspond to objects whose size difference from a size of the object corresponding to previous position of the object is less than a predetermined value.

8. A method of controlling an image capturing apparatus, comprising:
   an object detection step of detecting an object from image signals generated based on output signals from an image sensor;
   a selection step of selecting one object position as an object position to be focused from a plurality of object positions detected in one image signal by said object detection step, said selection step making a display unit, which displays images using the image signals, display a marker based on the selected object position; and
   a change step of making said selection step select an object position which is different from the object position selected by said selection step,
   wherein in a case that a plurality of object positions are detected by said object detection step when an instruction to move a position of the marker is issued by said change step, said selection step newly selects an object position, which is nearest to a previous position of the object previously detected from a previous image and corresponding to the marker currently displayed on the display unit, from the plurality of object positions which are detected by said object detection step and satisfy a predetermined condition, wherein the predetermined condition includes a status that the plurality of object positions are away from the previous position of the object by a predetermined distance, and said selection step makes said display unit display the marker based on the newly selected object position.

* * * * *